April 12, 1927.
S. CAMINITA
1,624,828
AUTOMOBILE DIRECTION SIGNAL SWITCH
Filed Dec. 15, 1925
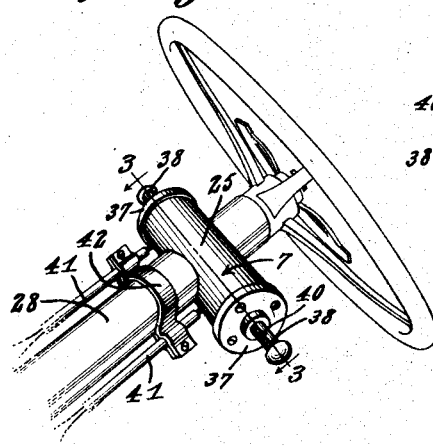
Santi Caminita, INVENTOR.
BY
Geo. P. Kimmel. ATTORNEY.

Patented Apr. 12, 1927.

1,624,828

UNITED STATES PATENT OFFICE.

SANTI CAMINITA, OF ST. LOUIS, MISSOURI.

AUTOMOBILE DIRECTION SIGNAL SWITCH.

Application filed December 15, 1925. Serial No. 75,569.

This invention relates to signal switches and pertains particularly to electrically operated directional signal switches.

The primary object of this invention is the provision, in a manner as hereinafter set forth, of a vehicle signal switch of improved design, simple in construction, strong and durable, simple to manipulate and inexpensive to manufacture and set up.

Another object of the invention is the provision, in a manner as hereinafter set forth, of an improved operating switch for signal devices, designed to be secured to a vehicle steering post in such a manner as to place the switch buttons, of which there are two, upon opposite sides of the steering column so that either of the buttons may be pressed easily and quickly without removing the hands from the steering wheel.

The invention will be best understood from a consideration of the following detailed description taken in connection with the accompanying drawings forming a part of this specification, with the understanding that the invention is not confined to any strict conformity with the showing of the drawings but may be changed and modified so long as such changes and modifications mark no material departure from the salient features of the invention as expressed in the appended claim.

In the drawing:—

Figure 1 shows a detailed perspective view of the upper portion of a vehicle steering wheel, showing the signal operating switch structure mounted upon the steering post thereof.

Figure 2 is a central longitudinal section taken upon the line 3—3 of the switch structure shown in Figure 1.

Referring now to the drawings in detail wherein like numerals of reference indicate corresponding parts throughout the several views, the switch structure is indicated as a whole by the numeral 7 with, of course, the usual electrical conductors and associate structure necessary for the completion of an operative device.

This switch structure comprises an elongated substantially cylindrical body 25 of an insulating material. This body, as is shown in Figures 1 and 2, has each end provided with a longitudinal bore 26, and between the ends of the bores 26 the body is recessed transversely as at 27. The switch housing thus assumes the form of a yoke having enlarged longitudinally bored end portions and a central connecting portion. The recess 27 is of the proper design to receive a steering wheel post 28 and when the same has been positioned in the recess a retaining plate 29 is placed in position across the post and securing screws 30 are passed through the ends of the retaining plate into the body 25 of the structure. It will thus be seen that the switch body may be securely fastened to the steering wheel post in such a manner as to position the switch buttons, about to be described, in positions of easy accessibility.

Secured in each of the bores 26 is a pair of switch terminals 31, the outer ends of which are divergent as shown for the purpose hereinafter set forth.

Covering the open ends of the bores 26 and also overlying the ends of the switch body 25 are covers or caps 37 through the center of each of which there extends a push-pull switch or contact arm 38, the inner end of the contact arm being formed to provide a pointed edge which when the arm is moved inwardly fills the space between the divergent ends of the switch points 31 thus closing the circuit between these points.

Any suitable means may be provided for holding the switch arm in in or out position, the means here shown being a spring pressed ball 39 encased in the cap 37 and adapted to alternately engage in notches 40 formed in the switch arm when the same is moved inwardly or outwardly. The connections 32 and 33 are passed into the bores 26 to the contact points 31 through apertures formed in the side wall of the switch housing and are led from the housing through the casing 41 held upon each side of the steering column 28 my means of the clamp 42.

From the foregoing description it will be readily seen that there has been provided an unique and novel signal structure, including a novel signal lamp casing structure and a handy, serviceable and unique controlling switch therefor.

Having thus described my invention, what I claim is:—

An electric switch of the character described, comprising an elongated substantially circular body made from insulating material, provided with end and intermediate bores, the intermediate bore opening only through one side of said body and adapted to accommodate a steering column of a motor vehicle, a retaining plate secured to the body across the intermediate bore to hold the body engaged upon the steering column, a pair of switch terminals mounted in each end bore and having diverging ends, and connected with a normally open electric circuit, caps removably fitted on the ends of the body to close the end bores, a push-pull switch arm slidably mounted centrally in each cap and engageable with the diverging ends of the switch terminals, and means for latching the switch arm when moved inwardly or outwardly relative to the cap.

In testimony whereof, I affix my signature hereto.

SANTI CAMINITA.